US009243606B2

(12) United States Patent
Dicembrino et al.

(10) Patent No.: US 9,243,606 B2
(45) Date of Patent: Jan. 26, 2016

(54) DEVICE FOR CONVERTING THE POWER OF SEA WAVE MOTION

(75) Inventors: Dario Dicembrino, Caselle Torinese (IT); Gerardo Alfarano, Caselle Torinese (IT); Domenico Campanale, Caselle Torinese (IT)

(73) Assignee: C.N.A. MECCANICA S.r.l., Leini(Torino) (IT)

( * ) Notice: Subject to any disclaimer, the term of this patent is extended or adjusted under 35 U.S.C. 154(b) by 289 days.

(21) Appl. No.: 13/988,065

(22) PCT Filed: Nov. 21, 2011

(86) PCT No.: PCT/IB2011/055221

§ 371 (c)(1),
(2), (4) Date: Jul. 18, 2013

(87) PCT Pub. No.: WO2012/066521

PCT Pub. Date: May 24, 2012

(65) Prior Publication Data

US 2013/0283778 A1    Oct. 31, 2013

(30) Foreign Application Priority Data

Nov. 19, 2010  (IT) .............................. TO2010A0920

(51) Int. Cl.
*F03B 13/18*  (2006.01)

(52) U.S. Cl.
CPC ........... *F03B 13/1815* (2013.01); *F03B 13/186* (2013.01); *F03B 13/1855* (2013.01); *F05B 2260/4031* (2013.01); *Y02E 10/38* (2013.01)

(58) Field of Classification Search
CPC ............... F03B 13/1815; F03B 13/186; F03B 13/1845; F03B 13/1855; F05B 2260/4031; F16H 1/20; F16H 1/22; F16H 2003/007; F16H 2003/008; F16H 2003/0935; F16H 3/083; F16H 3/10; F16H 3/093; Y02E 10/38
USPC .................... 60/496, 507, 506, 497, 502, 495
See application file for complete search history.

(56) References Cited

U.S. PATENT DOCUMENTS

| 739,538 | A | * | 9/1903 | Fredson | 60/507 |
| 854,082 | A | * | 5/1907 | Danford | 60/718 |
| 868,547 | A | * | 10/1907 | Green | 417/332 |

(Continued)

FOREIGN PATENT DOCUMENTS

| FR | 2427485 | 11/1977 |
| WO | WO 2007/081295 | 7/2007 |
| WO | WO 2010-067137 | 6/2010 |

OTHER PUBLICATIONS

Italian Search Report dated Aug. 16, 2012.

*Primary Examiner* — Thomas Denion
*Assistant Examiner* — Xiaoting Hu
(74) *Attorney, Agent, or Firm* — McCarter & English, LLP

(57) ABSTRACT

A device for converting wave-motion power having a float, which, in use, is vertically movable in response to the wave-motion; the motion being transmitted to an input shaft which rotates with reciprocating rotary motion and is connected to an output shaft by way of a transmission unit. The transmission unit transfers torque from the input shaft to the output shaft along two torque paths and has two freewheels that are arranged respectively along the two paths, and are configured so as to make the rotation of the output shaft unidirectional, independently of the rotation direction of the input shaft.

10 Claims, 4 Drawing Sheets

(56) References Cited

U.S. PATENT DOCUMENTS

| | | | |
|---|---|---|---|
| 892,567 A * | 7/1908 | Thrasher et al. | 60/506 |
| 919,928 A * | 4/1909 | Newman | 60/506 |
| 1,403,702 A * | 1/1922 | Melvin | 60/496 |
| 1,471,222 A * | 10/1923 | Taylor | 60/496 |
| 1,485,574 A | 3/1924 | Viora | |
| 3,911,287 A * | 10/1975 | Neville | 290/53 |
| 4,184,336 A * | 1/1980 | Lamberti | 60/507 |
| 4,389,843 A | 6/1983 | Lamberti | |
| 4,392,060 A * | 7/1983 | Ivy | 290/53 |
| 4,418,286 A * | 11/1983 | Scott | 290/42 |
| 8,464,527 B2 * | 6/2013 | Gerber et al. | 60/495 |
| 2007/0102937 A1 * | 5/2007 | Resen Steenstrup et al. | 290/53 |
| 2008/0164699 A1 * | 7/2008 | Vieira | 290/54 |
| 2010/0058754 A1 | 3/2010 | Fong et al. | |
| 2010/0225116 A1 * | 9/2010 | Cuong | 290/53 |

* cited by examiner

DEVICE FOR CONVERTING THE POWER OF SEA WAVE MOTION

TECHNICAL FIELD

The present invention relates to a device for converting wave-motion power.

BACKGROUND ART

As is known, the need is increasingly felt to exploit so-called alternative and/or renewable energy sources, to reduce the use of fossil fuels and, therefore, to not inflict environmental conditions with pollutants. In addition to solar energy and wind energy, another potential source of energy that could be used is that defined by the wave-motion of the seas. Said wave-motion involves a cyclical rise and fall of the upper surface of the sea and could be used to actuate mechanical members in a substantially continuous and inexhaustible way.

Devices are known which, through a combination of opposed overrunning clutches, turn the reciprocating and uneven motion of a float in a unidirectional rotary motion of a shaft connected to a generator of electricity. However, in order to optimize the efficiency of energy conversion, it is appropriate to optimize the size of the float in particular to reduce the device kinematic oscillation or torque output.

DISCLOSURE OF INVENTION

The aim of the present invention is to provide a device for converting optimized wave-motion power.

According to the present invention a device is made to convert wave-motion power, as defined in claim 1.

BRIEF DESCRIPTION OF THE DRAWINGS

The invention will now be described with reference to the annexed drawings, which illustrate a non limitative embodiment, in which.

BEST MODE FOR CARRYING OUT THE INVENTION

Figure 1:
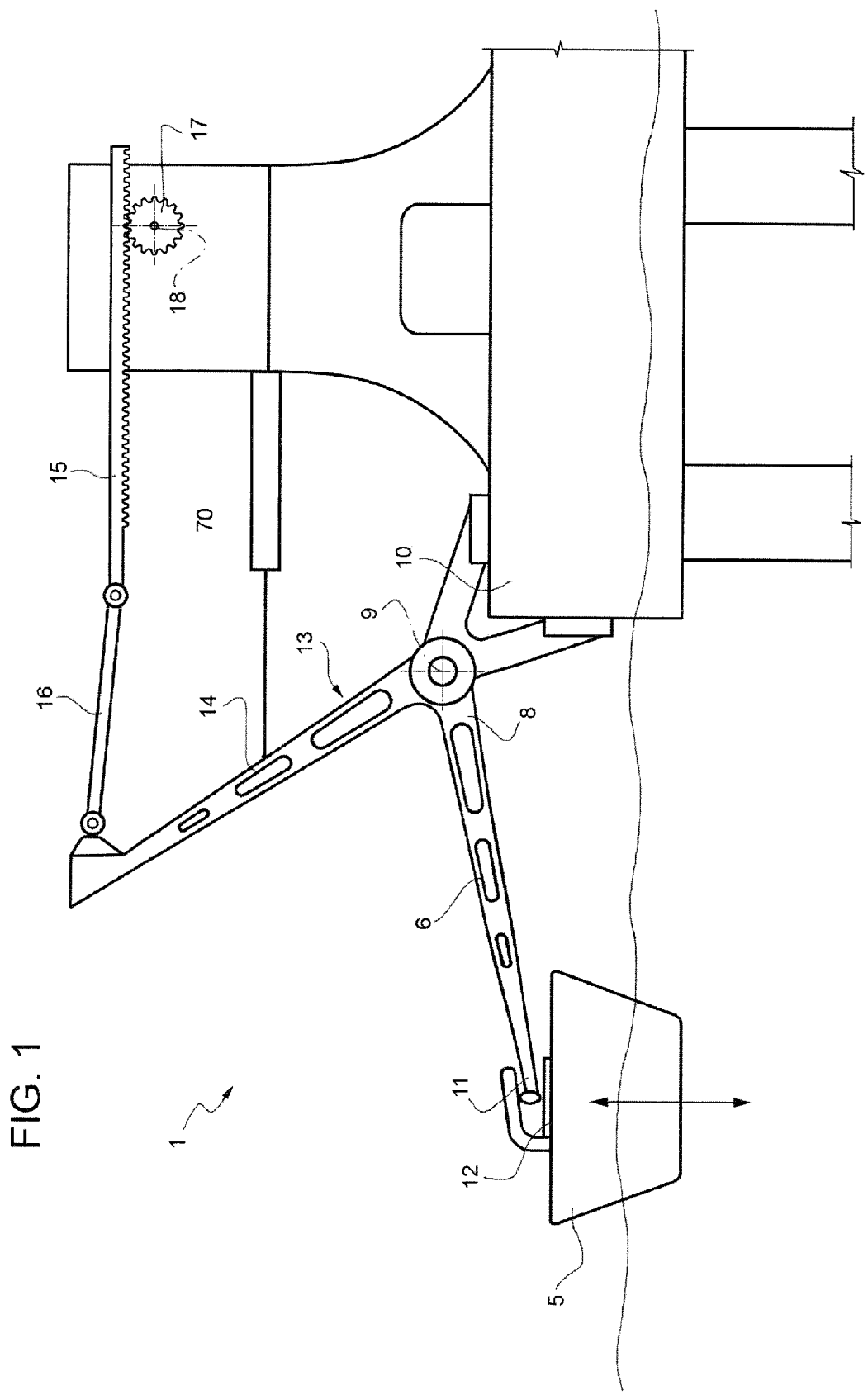
FIG. 1 schematically illustrates a preferred embodiment of the device for converting wave-motion power.
Figure 2:
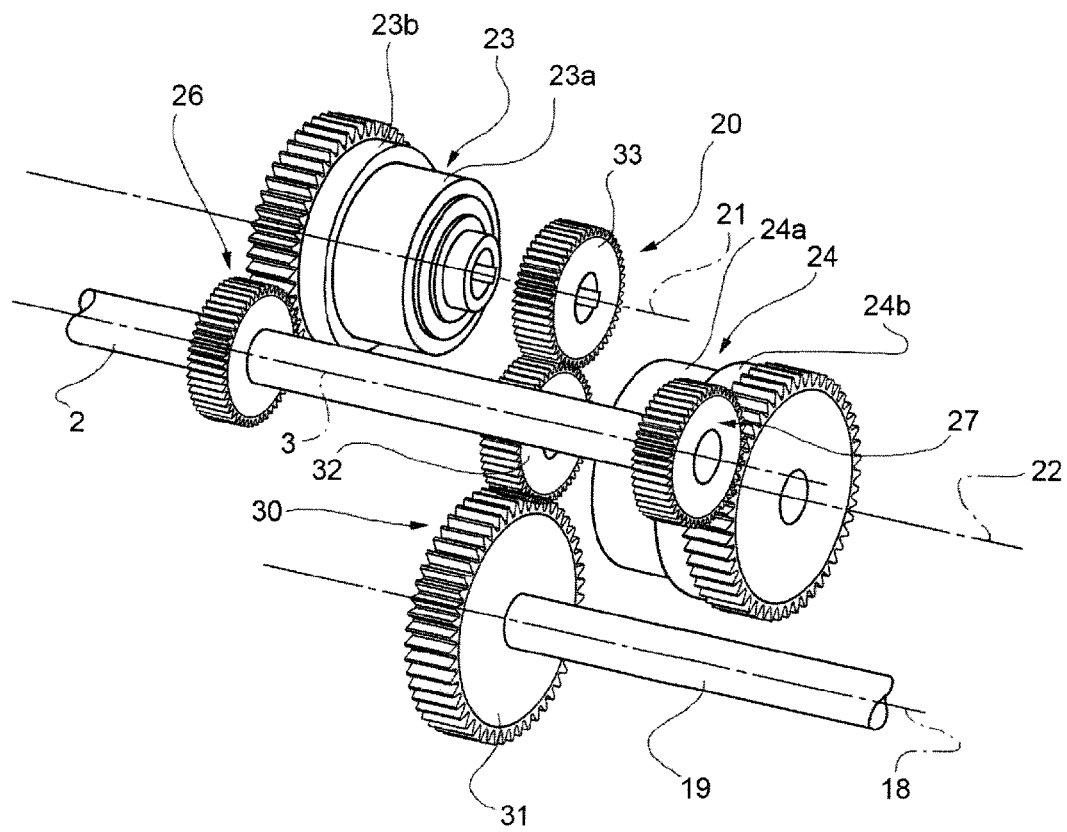
FIG. 2 schematically shows a detail of the device of FIG. 1.

In FIG. 1, numeral 1 indicates a device for converting wave-motion power into mechanical energy and to rotate a shaft 2 about its own axis 3 in a single rotation direction (FIG. 2).

The device 1 comprises a float 5 which is partially submerged in the sea and is connected to a swing arm 6. One end of the arm 6 is indicated by reference number 8, and is hinged around an axis 9 substantially horizontal to a structure 10 which is arranged outside of the sea and is fixed to the shore or at the bottom of the sea. The other end of the arm 6 is indicated by reference number 11 and is coupled to a top portion 12 of the float 5, preferably by a hinge or a junction to allow relative rotation about an axis parallel to the axis 9.

The arm 6 is part of a lever 13, which has an arm 14 which radially extends upwards and ends with an attaching portion connected to a rack 15 by way of a tie rod 16. The rack 15 meshes with a pinion 17 having a horizontal axis 18 and, preferably, is guided in a way not shown to translate with alternating motion along a direction tangential to the pinion 17 itself.

The pinion 17 drives in rotation a shaft 19, which preferably is coaxial to the pinion 17. In view of the alternating motion of the waves and, therefore, the swing of the arm 6, the pinion 17 and the shaft 19 rotate integrally with each other about the axis 18 with an alternating rotary motion, i.e. in opposite directions of rotation of an angle that depends on the vertical travel of the float 5.

With reference to FIG. 2, the axes 18 and 3 are preferably parallel. The shaft 19 is connected to the shaft 2 by way of a transmission unit 20, which transfers torque to the shaft 2, is configured to share the torque itself along two paths 21, 22 and 23 and comprises two freewheels 23, 24 or overrunning clutches respectively, arranged along the paths 21,22.

The freewheels 23, 24 are configured so as to make unidirectional rotation of the shaft 2, regardless of the rotation direction of the shaft 19. In other words, when the shaft 19 rotates, only a freewheel at a time transmits torque. The other of the freewheels 23, 24 becomes active and transmits torque only in case of reverse rotation of the shaft 19, whereas when the first disengages the rotation between the shafts 2, 19.

If the shaft 19 does not rotate, in case of arrest of the pinion 17, for example due to a momentary lack of waves on the sea, the two freewheels 23, 24 do not transmit torque, but leave the output members 23b, 24b free to rotate, so that the shaft 2 continues to rotate by inertia, always in the same rotation direction.

The freewheels 23, 24 comprise respective input members 23b, 24a operated with rotation directions opposite to each other but are configured so as to transmit torque to the respective members 23b, 24b in the same rotation direction. In the opposite direction, the output members 23b, 24b are angularly decoupled by respective input members 23a, 24a.

For example, when the pinion 17 and the shaft 19 rotate counterclockwise, the input member 23a is driven so as to rotate counterclockwise as well. The output member 23b receives input torque from the input member 23a and then rotates counterclockwise as well. Said torque is transmitted to the shaft 2, in particular by way of a gear transmission 26 which forms part of the path 21. The gear transmission 26 reverses the rotation direction between the output member 23b and the shaft 2, therefore in the formulated working hypothesis the shaft 2 rotates clockwise. At the same time, the input member 24a rotates clockwise (i.e., opposite to the rotation direction of the input member 23a). The output member 24b is free with respect to the rotation of the input member 24a and, therefore, is driven in rotation by the shaft 2, in particular by way of a gear transmission 27 which forms part of the path 22. The gears transmission 27 reverses the rotation direction, therefore in the formulated working hypothesis, with the shaft 19 which rotates counterclockwise and the shaft 2 that rotates clockwise, the output member 24b rotates counterclockwise.

But when instead the pinion 17 and the shaft 19 rotate clockwise, the input member 24a rotates counterclockwise. The output member 24b receives torque from the input member 24a and therefore also rotates counterclockwise. Said torque is transmitted to the shaft 19 by way of the gear transmission 27. As mentioned above, the gear transmission 26 reverses the rotation direction, therefore in the formulated working hypothesis the shaft 2 continues to rotate clockwise, despite the reversal of the rotation direction of the shaft 19. At the same time, the input member 23a rotates counterclockwise (i.e., opposite to the rotation direction of the input member 24a), and the output member 23b is free with respect to the rotation of the input member 23a. Therefore, the output member 23b is driven in rotation by the shaft 2, by way of the gear transmission 26, and therefore rotates clockwise.

To transmit the movement from the shaft 19 to the input members 23a, 24a, preferably the unit 20 comprises a gear train 30, which in turn comprises: a gear 31 coaxial and fixed with respect to the shaft 19, a gear 32 that meshes with the gear 31, and which is coaxial and fixed with respect to the input member 24a (by way of a shaft not shown); and a gear 33 that meshes with the gear 32 and which is coaxial and fixed with respect to the input member 23a (by way of another shaft not shown). Thanks to the meshing of the gears 32 and 33, the input members 23a and 24a rotate in opposite directions to each other.

Preferably, the transmission ratio between the shaft 19 and the input member 23a is equal to the transmission ratio between the shaft 19 and the input member 24a. Preferably, also the transmissions 26,27 have the same ratio, so that in the two torque paths 21,22 there is the same overall transmission ratio between the shaft 19 and the shaft 2.

Returning now to FIG. 1, the float 5 must have a density sufficiently low to allow floating and having an overall mass, however, sufficiently high to generate a satisfactory rotational torque on the pinion 17 also when the waves retreat and therefore the float 5 must go down due to the gravitational force of acceleration.

"Overall mass" stands for the sum of the mass of the float 5 itself and a possible mass fraction of the lever 13 which is discharged upon the float 5, and not at the point where the lever 13 is bound to the structure 10.

The overall mass, measured in kilograms, should preferably be comprised between 25% and 50% with respect to the volume occupied by the float itself measured in dm^3. As a reference, if a float had a volume of 1 dm^3 and the mass of 1 kg, a value of 100% would be achieved as well as an indifferent floating in distilled water. In this way the size of the float is optimized and has a substantially compact ratio mass—encumbrance to reduce environmental impact.

Preferably, the float has a circular shape, in section with horizontal section planes, to adapt to marine and climatic disturbances. The geometric shape of the float is therefore a truncated cone, with the smaller submerged base circle. Preferably, the difference between the diameter of the larger base circle and the diameter of the smaller base circle is equal to about 25% of the larger base circle, and the height is equal to about the diameter of the smaller base circle. For example, the diameter of the smaller base circle and the height are equal to 0.75 m, while the diameter of the larger base circle is equal to 1 m.

Figure 3:
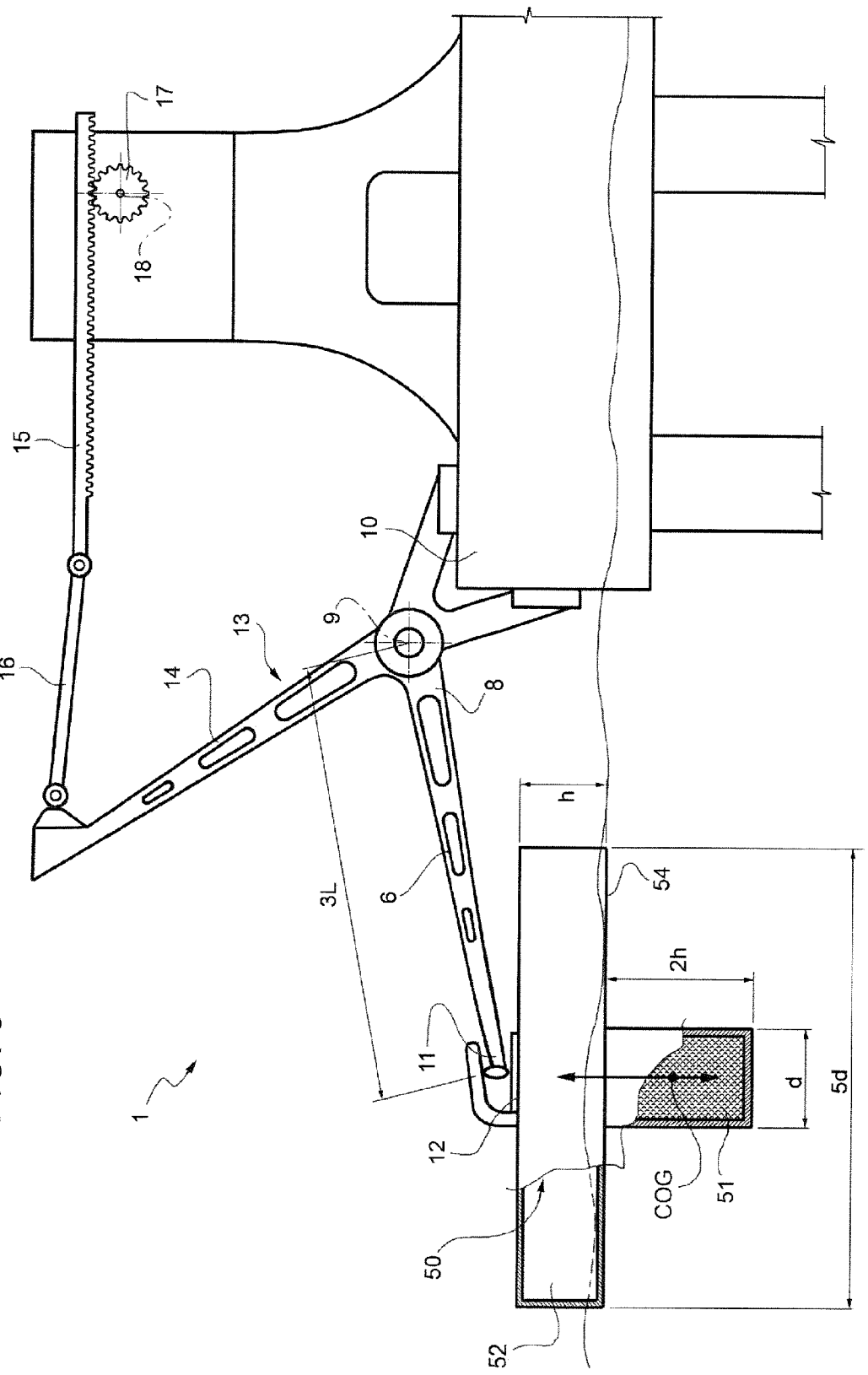
FIG. 3 schematically illustrates a device having an improved float according to the present invention.

With reference to FIG. 3, a float 50 can be advantageously made by combining a concentrated mass 51 and a highly-floating element 52. The float 50 has an axisymmetric shape and defines a single body having the center of gravity located preferably in the volume occupied by the concentrated mass 51 so as to ensure high stability to the float 50 itself. In other words, the float 50 does not have a uniform density and, preferably, the density of the concentrated mass 51 is greater than that of water and the arm 6 is connected to the float 50 from the opposite side of the concentrated mass 51 with respect to the highly-floating element 52. Furthermore, with respect to the free surface of water, the concentrated mass 51 has a transverse dimension less than the one of the highly-floating elements 52 so that the overall mass of the float 50 can be considered concentrated in a portion having a cross section less than that of the highly-floating element 52. Preferably, the maximum transverse dimension of the highly-floating element 52 is greater than or equal to four times the maximum transverse dimension of the mass concentrated element 51. In addition, the maximum height of the mass concentrated element 51 is at least 1.5 times greater than the maximum height of the highly-floating element 52.

According to a schematic example, considering the elements 51 and 52 as respective cylinders defined by a housing 54 of the float 50, the element 51 is filled with concrete and the element 52 is empty or filled with a low density polymer foam so that the overall density of the float 50 is discontinuous between element 51 and element 52. Considering negligible the masses of the element 52 and of the housing 54 with respect to the one of element 51, the center of gravity COG of the float 50 coincides with that of element 51 and is located within the volume of element 51 itself, particularly in the geometric center of the latter.

Based on the above mentioned proportions, the float 50 follows a rising profile of the waves effectively through the element 52 and, along a downward profile of the waves, the mass of the element 51 releases an amount of potential gravitational energy useful for reducing the torque fluctuations of shaft 2.

Figure 4:
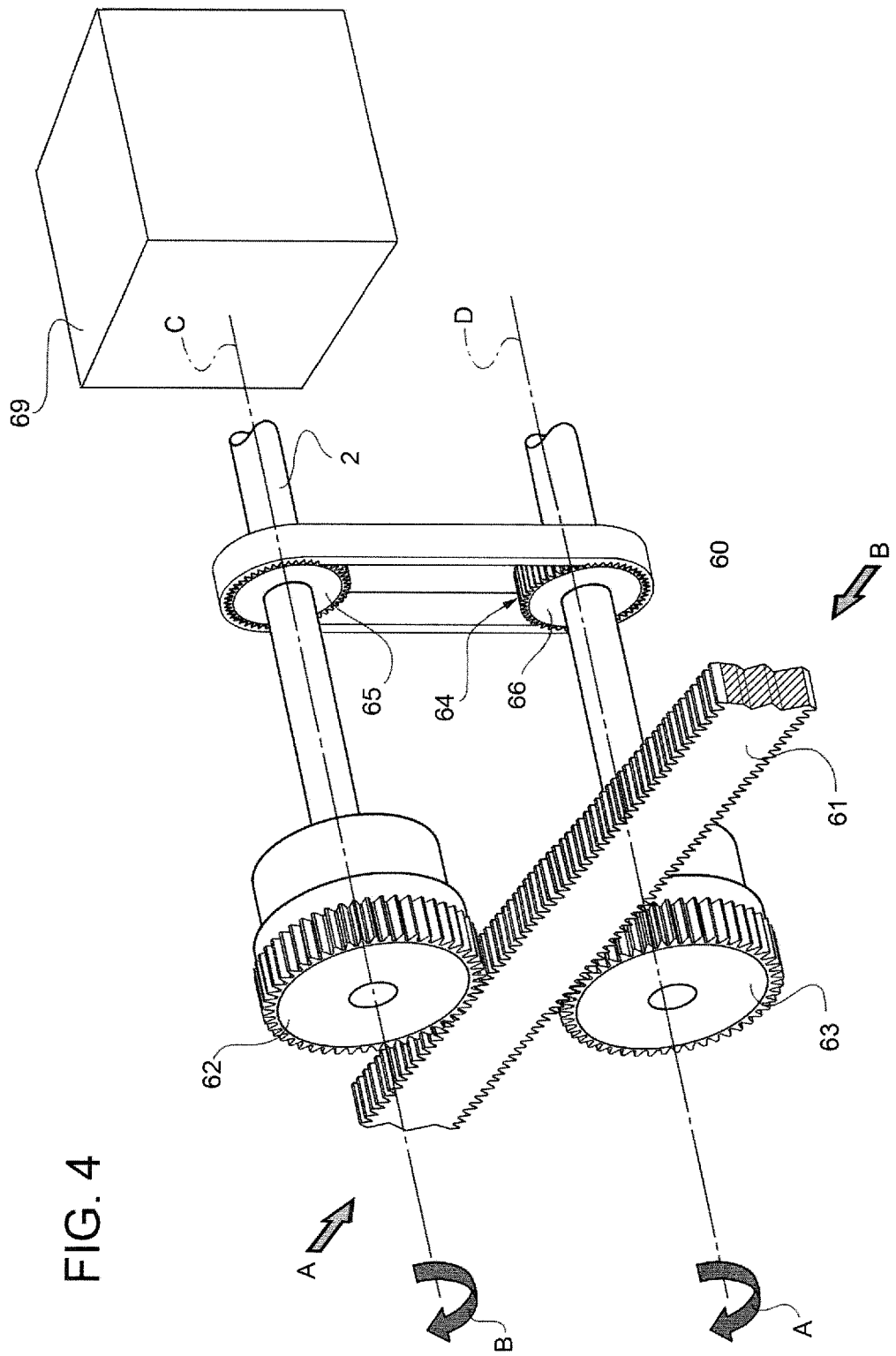
FIG. 4 illustrates a second embodiment of a detail of the present invention.

In FIG. 4 a drive unit 60 is schematically illustrated comprising a double toothed rack 61 connected to the rod 16 for the alternating motion induced by the float 50, a first and a second pinion 62 and 63 meshing on opposing teeth of the rack 61 and a transmission 64 for connecting together the pinions 62, 63 and the shaft 19 so that to the alternating motion of the rack 61 corresponds an unidirectional rotary motion of the shaft 2. Preferably, the transmission 63 comprises a pair of wheels 65, 66 connected by a belt or a chain with each other and respectively coupled to the pinions 62, 63. In addition, the pinions 62, 63 comprise respective overrunning clutches configured so that, for a linear movement of the rack 61 in a first direction, the pinion 62 drives in rotation the shaft 2 and the pinion 63 is neutral. When the linear movement of the rack 61 is in a second direction opposite the first direction, the pinion 63 drives in rotation the shaft 2 while the pinion 62 is neutral. The shaft 2 is connected to an output of the transmission 64 and the unit 60, therefore, comprises elements rotatable about no more than two axes C and D, respectively the first and second pinion 62, 63.

In addition, when the present invention comprises a dynamo to generate electricity, the overall mass of the float 5, 50 is calculated taking into account the mass and inertia in design conditions of the arm 6, and the transmission 60 on the basis of the minimum torque required by the dynamo itself in order for an input shaft of the latter to rotate at least at 10 rpm. It is necessary to consider that for applications for converting wave-motion power permanent magnet dynamos are optimal having an operating characteristic such that the torque required for operation decreases as the number of revolutions increases. Therefore, a run of at least 10 rpm provides the torque necessary for the operation of the dynamo also at a higher speed. Said value advantageously defines a threshold beyond which converting wave-motion power is most efficient.

Furthermore, as shown in FIG. 1, the device according to the present invention may comprise an actuator 70 to lock the arm 6 in a fixed and possibly preset position, such as during a storm to avoid damage. Preferably, the fixed position is such that the float 5, 50 is maintained for most of the time above the tops of the waves. Preferably, the actuator is designed to raise and retain in said fixed position the arm 6 and the float 50, 5 against gravity.

From the foregoing it is evident that the shaft 2 has an unidirectional rotary motion, and has a substantially regular rotational motion, therefore can be applied for dragging an electricity generator, such as a dynamo.

In addition, a float having an overall density in the range mentioned above is particularly suitable for recovering energy even when the wave is descending. In this way, the motion and the torque of the shaft 2 are further regularized to the benefit of the production of energy, particularly electricity, with high yields. In particular, at growing density of the float the motion would be regularized, but small to medium sized waves would have a low or minimal impact in reducing the energy recovered. In contrast, a too light float would increase the irregularity of the motion in order to have a negative impact on the efficiency of converting power, particularly if the float is associated to a dynamo.

A further advantage of a device comprising a float according to claim 1 is that a beneficial compromise between conflicting requirements is found. In fact, to follow the wave profile efficiently, it would be required a low density value, in particular to take advantage of the slope between the trough to the crest of the wave. On the contrary, a certain compactness in transverse dimension, which would lead to an increase in density, it is useful to fit the float at not excessive wavelengths so that the device works with acceptable yields in most number of possible sea conditions. The best compromise is found by the range described above, and in a further advantageous way, when said range is between 25% and 30%.

The float 50 has a non-uniform density and thus the stability of the float on the waves is improved. In particular, the shape of the latter is best followed, individually or in combination, by the fact that the float 5, 50 is hinged to the arm 6, the fact that the float itself presents a center of gravity arranged towards the lower part of the volume of the float and the fact that the element 52 presents cross-sectional dimensions much larger with respect to the element 51.

In addition, the gear ratios can be modified, without inhibiting the position of shafts 2, 19 and the two shafts (not shown) on which are keyed the freewheels 23, 24 and gears 32, 33, according to that which will use the mechanical power supplied from the shaft 2.

Furthermore from the foregoing it appears evident that to the described device 1 changes and variations can be applied without going beyond the protective scope of the present invention, as defined in the appended claims.

In particular, the gear ratios of the two paths 21,22 may be different one from the other, to compensate for any differences in torque between the ascent and descent phase of the float 5.

The gear transmissions could be replaced by a toothed belt or chain gears, for example, for less expensive solutions and/or solutions with relatively low power.

The shaft 19 could be connected to the end 8 to rotate about the axis 9, or may be coupled to the arm 6 in a different way from the one illustrated.

The invention claimed is:
1. A device for converting wave-motion power, comprising:
   (a) a float (5, 50), which, in use, is movable in opposition to the gravity acceleration in response to the wave-motion;
   (b) an input shaft (19) and an output shaft (2) rotatable about respective axes (18,3);
   (c) a first transmission means (6,13,15,16,17) for transmitting the motion of said float (5) in a reciprocating rotary motion of said input shaft (19);
   (d) a second transmission means (20), which transfers torque from said input shaft (19) to said output shaft (2), is configured so as to split the torque in two torque paths (21,22) and comprises two freewheels (23,24) arranged respectively along said paths, (21,22);
   said freewheels (23,24) being configured so as to make the rotation of said output shaft (2) unidirectional, independently of the rotation direction of said input shaft (19),
   said device being characterized in that said float (5, 50) has an overall density in the range between 25% and 50% of the density of water, said overall density being evaluated taking into account at least said first transmission means (6,13,15,16,17),
   wherein said float (50) has a non-uniform density and comprises a first portion (51) having a first density and a second portion (52) having a second density lower than that first density, said first transmission means comprising an arm (6) hinged to said float (50) from the opposite side of said first portion (51) with respect to said second portion (52), wherein said second portion (52) has a maximum transverse dimension of at least four times the maximum transverse dimension of said first portion (51), the density of said float (50) can be considered concentrated in the volume of said first portion (51) and wherein said first portion (51) has a maximum height of at least 1.5 times the maximum height of said second portion (52); and
   further characterized in that said freewheels (23,24) are mounted on respective shafts parallel and distinct from said input shaft (19);
   said second transmission means (20) comprising a gear train (30) having;
   (e) a first gear (31) coaxial and fixed with respect to said input shaft (19);
   (f) a second gear (32), which meshes with said first gear (31) and is coaxial and fixed with respect to an input member (24a) of one of said freewheels (24), and
   (g) a third gear (33), which meshes with said second gear (32) and is coaxial and fixed with respect to an input member (23a) of the other of said freewheels (23).

2. The device according to claim 1, characterized in that the axes (18,3,C,D) of said input and output shafts (19,2) are parallel, and in that said input members (23a, 24a) are operated with opposite rotation directions.

3. The device according to claim 2, characterized in that said freewheels (23,24,62,63) are configured so as to transmit torque to respective output members (23b,24b) in the same rotation direction; in the opposite direction, said output members (23b,24b) being angularly free with respect to respective said input members (23a, 24a).

4. The device according to claim 3, characterized in that said freewheels (23,24) are mounted on respective shafts parallel and distinct from said output shaft (2); said second transmission means (20) comprising two transmissions (26, 27), which are respectively part of said torque paths (21,22) and are each interposed between said output shaft (2) and a corresponding said freewheel (23,24).

5. The device according to claim 4, characterized in that each of said transmissions inverts the rotation direction between said output shaft (2) and the corresponding said freewheel (23,24).

6. The device according to claim 4, characterized in that said transmissions (26,27) are gear transmissions.

7. The device according to claim 1, characterized in that said first transmission means comprise a lever arm having a first end coupled to a top portion of said float and a second end hinged to a fixed structure.

8. The device according to claim 1, further including a permanent magnet dynamo (69) and in that said float (5,50) is sized to provide at least the required torque to said dynamo at a rate of 10rpm.

9. The device according to claim 1, further including an actuator (70) connected to said first transmission means (6,13,15,16,17) to lock said float (5,50) in a preset position.

10. The device according to claim 1, characterized in that the overall density is between 25% and 30% of the density of water.

* * * * *